(12) United States Patent
Frison

(10) Patent No.: US 11,841,850 B2
(45) Date of Patent: Dec. 12, 2023

(54) DETERMINING A KNOWLEDGE GRAPH QUERY HAVING A RESPONSE CONFORMING TO TRAINING SAMPLES

(71) Applicant: SAP SE, Walldorf (DE)

(72) Inventor: Giancarlo Frison, Munich (DE)

(73) Assignee: SAP SE, Walldorf (DE)

( * ) Notice: Subject to any disclaimer, the term of this patent is extended or adjusted under 35 U.S.C. 154(b) by 148 days.

(21) Appl. No.: 17/546,450

(22) Filed: Dec. 9, 2021

(65) Prior Publication Data
US 2023/0153296 A1 May 18, 2023

(30) Foreign Application Priority Data

Nov. 15, 2021 (EP) .................................... 21208108

(51) Int. Cl.
*G06F 16/242* (2019.01)
*G06N 5/025* (2023.01)
(52) U.S. Cl.
CPC ......... *G06F 16/2425* (2019.01); *G06N 5/025* (2013.01)
(58) Field of Classification Search
CPC .................................................. G06F 16/2425
See application file for complete search history.

(56) References Cited

U.S. PATENT DOCUMENTS

2022/0188850 A1* 6/2022 Costabello ............. G06N 3/044

OTHER PUBLICATIONS

Communication: "Extended European Search Report", dated May 16, 2022 (dated May 16, 2022), European Patent Office, for European Application No. 21208108.7-1203, 11 pages.

(Continued)

*Primary Examiner* — Baoquoc N To
(74) *Attorney, Agent, or Firm* — Buckley, Maschoff & Talwalkar LLC

(57) ABSTRACT

Provided are a computer-implemented method, a computer program and a system for determining a knowledge graph query having a response conforming to a plurality of training samples. The method may comprise receiving a knowledge graph; receiving the training samples, wherein each of the training samples is a relation, wherein each value in the training samples corresponds to one of the nodes of the knowledge graph, wherein the training samples include one or more positive training samples and one or more negative training samples; identifying one or more variables from the training samples. The method may further comprise determining a plurality of relations, wherein each of the relations includes a plurality of symbols, the symbols including the identified variables; determining a test metarule, the test metarule including a first relation from the plurality of relations; iteratively querying the knowledge graph using the test metarule and controlling development of the test metarule according to responses to the queries. Each of the responses may be one of the following: NOKP, which is returned when the test metarule does not match all of the positive training samples, OKP, which is returned when the test metarule matches all of the positive training samples but does not exclude all of the negative training samples; OKPN, which is returned when the test metarule matches all of the positive training samples and excludes all of the negative training samples. When the response to the querying is OKPN, the method may further comprise ending the querying and using the developed test metarule as a final metarule; and computing the knowledge graph query having a response conforming to the training samples from the final metarule.

20 Claims, 4 Drawing Sheets

(56) References Cited

OTHER PUBLICATIONS

Frison, Giancarlo "Knowledge Graphs with Inductive Logic Programming on CML21", SAP Commnity. May 12, 2021 (May 12, 2021), XP055916649, Retrieved from th Internet: URL:https://web.archieve.org/web/20210512174446/https://blogs.sap.com/2021/05/06/knowledge-graphs-with-inductive-logic-programming-on-cml21/, [retrieved on Apr. 29, 2022], 5pgs.

Frison, Giancarlo "Automatic Rule Learning over Knowledge Graphs", Jul. 26, 2021 (Jul. 26, 2021), XP055916648, Retrieved from th Internet: URL:Https://web.archieve.org/web/20210726071850/https://blogs.sap.com/2021/07/23/automatic-rule-learning-over-knowledge-graphs/, [retrieved on Apr. 29, 2022], 6pgs.

Cropper, Andrew et al., "Learning programs by learning from failures", ARXIV.Org, Cornell University Library, 201 Olin Library Cornell University Ithaca, NY 14853, Oct. 5, 2020 (Oct. 5, 2020), XP081777262, (pp. 1-56).

Cropper, Andrew et al., "Inductive logic programming at 30: a new introduction", Journal of Artificial Intelligence Research, vol. 1 (1993), ARXIV.Org, Cornell University Library, 201 Olin Library Cornell University Ithaca, NY 14853, Oct. 18, 2020 (Oct. 18, 2020), XP081743395, (pp. 1-66).

\* cited by examiner

DETERMINING A KNOWLEDGE GRAPH QUERY HAVING A RESPONSE CONFORMING TO TRAINING SAMPLES

CROSS-REFERENCE TO RELATED APPLICATIONS

The present application claims priority to EP Application No. 21208108.7, filed Nov. 15, 2021, the contents of which are incorporated herein in their entirety for all purposes.

DESCRIPTION

The technical field relates to graph databases, specifically, efficiently computing an accurate knowledge graph query. The knowledge graph query may be used to select data from a knowledge graph. In this context, accuracy refers to conformance with a plurality of training samples, where conformance may mean that positive training samples are returned by the query and/or negative training samples are not returned by the query.

The knowledge graph may use a graph data model or graph topology. The knowledge graph may include a plurality of nodes (i.e., vertices); some or all of the nodes may be connected by edges (i.e., links or lines). The edges may represent relationships between the nodes they connect, such that related pairs of nodes are connected by edges and there is no more than one edge between any two nodes. Properties may be associated with nodes and/or edges.

The knowledge graph may be stored in a graph database. The graph database differs from a conventional relational database in that relationships of the graph database are explicit and can be labeled, directed, and given properties. In addition, querying relationships may be faster in the graph database compared to the conventional relational database. More specifically, the knowledge graph may be stored in a NoSQL database having no predefined schema. The graph database may be implemented as an Resource Description Framework (RDF) triplestore (subject, predicate, object), storing a network of objects and using inference (deriving knowledge from RDF data and inference rules) to uncover new information from existing relations. As an alternative to the RDF triplestore, the graph database may be implemented using the property graph model, where data is organized as nodes, relationships and properties. As an alternative to the NoSQL database, data may be stored in a relational format including a node table and an edge table. Node attributes/properties may match columns of the node table. Edge attributes/properties may match columns of the edge table. The edge table may include two columns in addition to the columns in the node table, referencing a source node and a target node of each edge. The tables may be implemented as views (i.e. an aggregation of physical tables) or virtual tables (i.e., accessing data in another database). Advantageously, graph functions (e.g., shortest path, breadth first search, strongly connected components—to find clusters) can be applied to the data stored in the graph database. In addition, nodes and relationships may be part of a join of tables.

Writing a query for selecting data from the knowledge graph may be a time-consuming and error-prone task. The knowledge graph query may comprise one or more rules. An inductive logic programming (ILP) algorithm may be used to compute the query.

The ILP algorithm may be a machine learning algorithm to compute a model (i.e., one or more rules) that generalizes a plurality of training samples (the training samples may also be referred to as "samples"). The ILP algorithm may take the knowledge graph and the plurality of training samples as input, and output a query having a response conforming to the training samples when the query is executed against the knowledge graph. Finding the query that produces the response is an NP-hard problem, requiring non-deterministic polynomial-time and having exponential complexity $(O^n)$. The ILP algorithm may rely on combinatorial search to reduce a large search space by reducing the size of the search space and/or employing heuristics. The ILP algorithm might not rely on interpreters such as neural networks or statistical processes such as regression. The ILP algorithm may return an optimal solution or the best available solution in the search space that was explored. Compared to conventional approaches, embodiments described below may provide a more efficient way of controlling a search to determine the knowledge graph query. Specifically, disclosed techniques may lead to reduction of the size of the search space (e.g., reducing the permutations of nodes and edges of the knowledge graph that are queried), thereby producing an accurate result with fewer queries.

According to an aspect, a computer implemented method for determining a knowledge graph having a response conforming to a plurality of training samples is provided. The method comprises receiving a knowledge graph. The method further comprises receiving the training samples. The training samples include one or more positive training samples and one or more negative training samples. Each of the training samples is a relation, wherein each value in the training samples corresponds to (or is from) one of the nodes of the knowledge graph. The method further comprises identifying one or more variables from the training samples.

The method further comprises determining a plurality of relations (e.g., list of relations), wherein each of the relations includes (e.g., consists of) a plurality of symbols, the symbols including the identified variables. The method further comprises determining a test metarule, the test metarule including a first relation from the plurality of relations. The method further comprises iteratively querying the knowledge graph using the test metarule and controlling development of the test metarule according to responses to the queries. Each of the responses to the queries is one of the following:

NOKP, which is returned when the test metarule does not match all of the positive training samples;

OKP, which is returned when the test metarule matches all of the positive training samples but does not exclude all of the negative training samples;

OKPN, which is returned when the test metarule matches all of the positive training samples and excludes all of the negative training samples.

The method further comprises, when the response to the querying is OKPN, ending the querying and using the developed test metarule as a final metarule. The method further comprises computing (or determining) the knowledge graph query having a response conforming to the training samples from the final metarule.

In exceptional cases, there may be zero negative training samples. In such cases, OKP is excluded as a response and OKPN is returned when the test metarule matches all of the positive training samples.

The training samples may be relations. Accordingly, the arity of the training samples may be equal to the number of arguments or operands of each relation of the training samples. In some cases, the training samples may have an arity of one or two. Each value in the training samples may be a property (or name) of one of the nodes of the knowledge graph.

In some cases, the number of identified variables may be one or two. The identified variables may also be referred to as instantiated variables.

The plurality of relations may be determined by computing permutations of the identified variables. Permutations of the identified variables with constants may be added as further relations and permutations of the identified variables with intermediate (temporary or uninstantiated) variables and constants may be also added as further relations. When determining further relations, an order of priority may be followed. Variables that have been restricted a lower number of times may be restricted in the further relations before restricting variables that have been restricted a greater number of times, where each restriction involves relating a variable with a constant.

The plurality of relations may serve as a basis for determining and controlling development of the test metarule. Each relation of the plurality of relations may be added to the test metarule exactly one time. In other words, each relation of the plurality of relations is tested exactly once.

The queries used to iteratively query the knowledge graph may be based on (computed from) the test metarule and referred to as check queries. The query computed from the final metarule may be referred to as a bind query.

The queries (e.g., the check queries or the bind query) may be implemented using a query language that captures not only entity attributes but also the relationships between entities in statements (e.g., entity1 has propertyA relationship to entity2). As an example, a resource description framework (RDF) query language, such as SPARQL Protocol and RDF Query Language (SparQL), may be used and the queries may be computed by using values from the training samples in place of variables in the relations of the test metarule.

The queries may be derived from the test metarule via a syntactic conversion, that is, a converter may take the test metarule and convert the test metarule into a corresponding query in the query language. The knowledge graph (or an associated database storing the knowledge graph) may include corresponding namespaces and/or uniform resource identifiers (URIs) for each node.

Determining whether the test metarule matches positive training samples or excludes negative training samples may be carried out by computing a platform specific query (e.g., in SparQL) from the test metarule and querying the knowledge graph using the platform specific query.

The knowledge graph may comprise a plurality of nodes. A subset (e.g., a proper subset) of the nodes may be connected by edges. There may be no more than one edge between any two nodes. In some cases, there is exactly one edge between every two nodes, such that every relation in the knowledge graph has an arity of two.

Each of the nodes may have a name and each of the edges may represent a relationship between two nodes. Each edge may have one or more of the following: a label, a direction, at least one property. Accordingly, the knowledge graph may be a directed graph.

The number of identified variables may correspond (be equal) to the arity of the training samples (e.g., the arity of each relation of the training samples, where the relations have the same arity).

If the arity of the training samples is one or two, then the number of identified variables may correspond (be equal) to the arity of the training samples. If the arity of the training samples is greater than two, reification may be employed to obtain binary relations from the training samples without losing information. Specifically, identifying the one or more variables may comprise obtaining binary relations from the training samples via reification, and identifying two variables from the binary relations.

The training samples may include one or more positive training samples and/or one or more negative training samples. Each of the training samples may have a specified number of values, wherein the specified number of values may be one or two. The values in the training samples may correspond to variables in the metarules.

Each relation in the plurality of relations may have a specified number of variables, wherein the specified number of variables corresponds to (e.g., is equal to) the specified number of values.

The plurality of relations may include one or more of the following: permutations of the identified variables, permutations of the identified variables with constants that appear in the training samples and in the knowledge graph, permutations of the identified variables with intermediate variables and the constants. The number of intermediate variables may be limited according to a predetermined limit.

The method may further comprise defining one or more limits for variables, wherein the limits include one or more of the following:

a maximum number of intermediate variables and/or a maximum number of intermediate variables per identified variable;

a maximum number of restrictions per variable;

a maximum number of restrictions, wherein each restriction comprises a relation including a variable and a constant.

Values for the maximums depend on the depth of the search, desired speed and the quantity of data. Lower values may lead to a faster search and/or could be desirable if a solution might be found relatively quickly. Higher values may lead to a more accurate but slower search.

The symbols may further include the maximum number of intermediate variables and one or more constants. The intermediate variables can be used to join one of the identified variables to another one of the identified variables and/or to join one of the identified variables to one of the constants. Joins involving other combinations of symbols are also possible. The constants may be determined from the knowledge graph. More specifically, each constant may correspond to a property of a node in the knowledge graph. The constants may be replaced by names of corresponding nodes of the knowledge graph when computing the knowledge graph query.

The intermediate variables may correspond to nodes of the knowledge graph that are not represented in the training samples. The joins discussed above may also be referred to as a join of relations in the knowledge graph. Accordingly, the intermediate variables may be used to join a relation of the knowledge graph including one of the identified variables to a relation in the knowledge graph including another one of the identified variables. The intermediate variables may also be used to join a relation including one of the identified variables to a relation including one of the constants.

Hence, the intermediate variables may correspond to variables appearing in relations with the identified variables in the knowledge graph. The intermediate variables may also correspond to variables appear in relations with constants in the knowledge graph.

Variables and constants may be determined from the training data by looking up the values in the training data in the knowledge graph.

A join (as mentioned above) using one of the intermediate variables may include two relations, both of which include the one of the intermediate variables. The two relations may further include two different identified variables, one of the identified variables and one of the constants, two different constants, another intermediate variable and one of the constants, and other permutations.

The iterative querying and development of the test metarule may include repeating the following steps:
computing a query from the test metarule,
executing the query against the knowledge graph, and
developing that test metarule according to the response to the query.

Thus, one or more relations may be added to and/or removed from the test metarule according to whether the response to the query is NOKP or OKP. The iterative querying and development steps above may be repeated until OKPN is returned as a response or no further variables remain to be tried (i.e., no nodes and edges of the knowledge graph that have not been excluded remain to be searched). If no further variables remain to be tried and OKPN has not been returned as a response, then a knowledge graph query conforming to the training samples cannot be computed.

Controlling the development of the test metarule may comprise, when OKP is returned as a response and none of the limits for variables has been reached, restricting one of the variables in the test metarule. The restricting may comprise combining the further variable with a restriction in a new relation, and adding the new relation to the test metarule. The restriction may include one of the constants.

The one of the variables in the test metarule that is restricted may be determined according to a prioritization scheme such that identified variables are restricted first, followed by intermediate variables. When each variable has been restricted once, other variables may be restricted so as to use the variables one after another. In other words, variables may be restricted according to the prioritization scheme, but the number of restrictions for any given variable may be kept as close to the number of restrictions for any other variable as possible.

Controlling the development of the test metarule may comprise adding one or more relations from the plurality of relations to the test metarule, possibly in conjunction with deleting relations in the test metarule. The development of the test metarule may be based on responses to the iterative querying of the knowledge graph (i.e., NOKP, OKP, OKPN). In particular, when NOKP is returned as the response, the development may further comprise rolling back addition of at least one relation from the test metarule before adding the relations to the test metarule. The rolling back may include treating the metarule like a stack data structure, such that more recently added relations are removed (or popped) from the metarule before less recently added relations. The combination of adding and rolling back may be referred to as switching.

Accordingly, the NOKP response may be used to reduce the size of the search space by excluding relations from the test metarule that do not match the positive training samples. In this way, rather than trying all possible permutations of the symbols, permutations that cannot lead to a response of OKPN may be excluded. This may result in more efficient querying of the search space, thereby more quickly arriving at the knowledge graph query having a response conforming to the plurality of training samples.

Controlling the development of the test metarule may comprise, when NOKP is returned as a response or one of the limits for variables has been reached (e.g., the maximum number of intermediate variables has been tried in the test metarule), switching at least one of the relations of the test metarule with corresponding relations from the plurality of relations.

The switching may comprise, when a next test relation (or next relation) from the plurality of relations includes a permutation of one of the relations in the test metarule that has not yet been tried switching the one of the relations (and subsequent relations in the test metarule) with the next test relation. When there is no next test relation in the plurality of relations, ending the querying without finding of final metarule.

The method may further comprise adding at least one join to the test metarule, the join including (at least) one of the intermediate variables. The join may include one of the following:
one relation having one of the intermediate variables in the test metarule and one of the constants that is not in the test metarule;
a first relation having one of the identified variables in the test metarule and one of the intermediate variables not in the test metarule and a second relation having one of the intermediate variables not in the test metarule and one of the constants;
a first relation having one of the identified variables and one of the intermediate variables and a second relation having one of the intermediate variables and one of the constants;
a first relation having one of the intermediate variables in the test metarule and another one of the intermediate variables in the test metarule and a second relation having the other one of the intermediate variables in the test metarule and one of the constants not in the test metarule.

More generally, the join may include one of the identified variables and one of the intermediate variables. The join may include a first relation having one of the identified variables and one of the intermediate variables and a second relation having a different one of the identified variables and the one of the intermediate variables. The preceding join connects two identified variables using an intermediate variable. Joins may also be used to connect an identified variable and one of the constants, to connect different constants or even to connect two intermediate variables. Use of joins may enable the search space to be explored more thoroughly.

Identifying the one or more variables from the training samples may comprise identifying at least two variables from the training samples.

Each metarule may be a plurality of symbols for relations of the knowledge graph query. The metarules may be a type of language bias used to restrict the search space. More specifically, the metarules may be a syntactic bias (restricting syntax, such as the number of variables allowed) as opposed to a semantic bias (restricting semantics, such as whether variables are functional or your reflexive). The metarules may be applicable to different implementations and databases. The knowledge graph query computed from the final metarule and the queries executed against the knowledge graph and derived from the test metarule may be specific to a particular implementation, such as the RDF query language, SparQL.

The knowledge graph may be or function as a NoSQL database and/or a graph database. The knowledge graph may have no predefined schema. The knowledge graph may function as the NoSQL database by means of the tables for nodes and edges, as described above.

According to another aspect, the methods described above may be implemented as a computer program comprising instructions that, when the program is executed by a computer, cause the computer to carry out one or more of the described methods. The computer program may be embodied in a computer program product comprising a computer readable instructions, the execution of which results in execution of the computer program. In addition or alternatively, the computer program may be tangibly embodied in computer readable media.

According to yet another aspect, a computer system for determining a knowledge graph query having a response conforming to a plurality of training samples is provided. The system comprises one or more processors. The processors are configured to receive a knowledge graph and receive the training samples. Each of the training samples is a relation, wherein each value in the training samples corresponds to one of the nodes of the knowledge graph. The training samples include one or more positive training samples and one or more negative training samples.

The processors are further configured to identify one or more variables from the training samples. The processors are further configured to determine a plurality of relations, wherein each of the relations includes a plurality of symbols, the symbols including the identified variables. The processors are also configured to determine a test metarule, the test metarule including a first relation from the list of relations. The processors are further configured to iteratively query the knowledge graph with the test metarule and control development of the test metarule according to responses to the queries. Each of the responses is one of the following:
- NOKP, which is returned when the test metarule does not match all of the positive training samples;
- OKP, which is returned when the test metarule matches all of the positive training samples but does not exclude all of the negative training samples;
- OKPN, which is returned when the test metarule matches all of the positive training samples and excludes all of the negative training samples.

When the response to the query is OKPN, the processors are configured to end the iterative querying and use the developed test metarule as a final metarule. The processors are further configured to compute the knowledge graph query having a response conforming to the training samples from the final metarule.

The subject matter described in the present disclosure can be implemented as a method or on a device, possibly in the form of one or more computer programs (e.g., computer program products). Such computer programs may cause a data processing apparatus to perform one or more operations described in the present disclosure.

The subject matter described in the present disclosure can be implemented in a data signal or on a machine readable medium, where the medium is embodied in one or more information carriers, such as a CD-ROM, a DVD-ROM, a semiconductor memory, or a hard disk. In particular, disclosed subject matter may be tangibly embodied in a machine (computer) readable medium.

In addition, the subject matter described in the present disclosure can be implemented as a system including a processor, and a memory coupled to the processor. The memory may encode one or more programs to cause the processor to perform one or more of the methods described in the application. Further subject matter described in the present disclosure can be implemented using various machines.

Details of one or more implementations are set forth in the exemplary drawings and description that follow. Other features will be apparent from the description, the drawings, and from the claims.

DETAILED DESCRIPTION

In the following text, a detailed description of examples will be given with reference to the drawings. Various modifications to the examples may be made. In particular, one or more elements of one example may be combined and used in other examples to form new examples.

Figure 1:
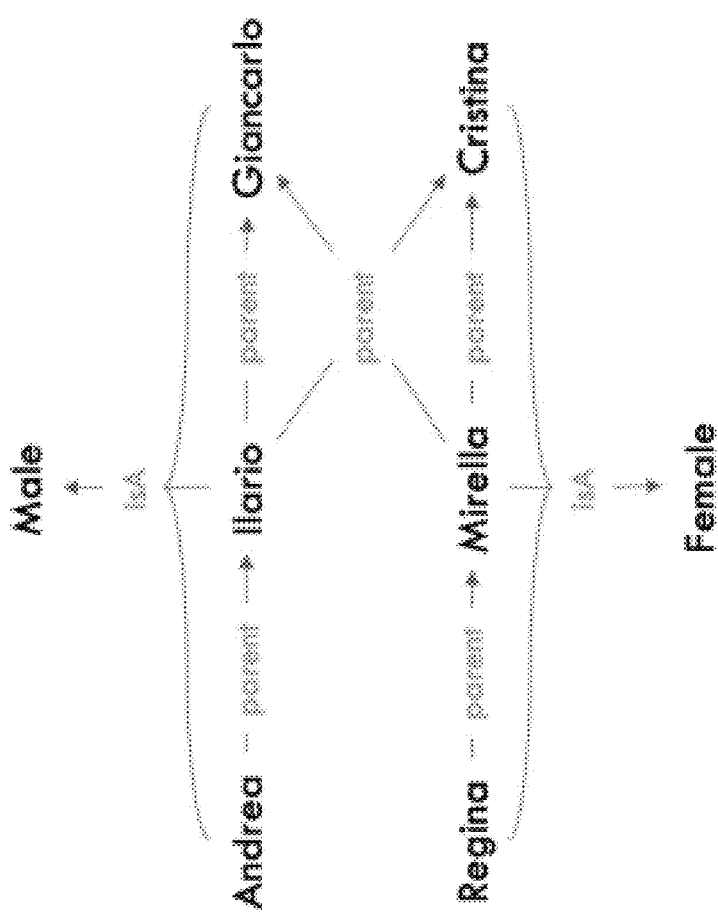
FIG. 1 shows an exemplary graphical depiction of a simple knowledge graph.

FIG. 1 shows an exemplary graphical depiction of a knowledge graph. The knowledge graph is used to explain some embodiments. The relations corresponding to the graphical depiction of the knowledge graph are provided below:
parent(Ilario, Giancarlo)
parent(Mirella, Giancarlo)
parent(Andrea, Ilario)
isA(Andrea, male), isA(Ilario, male), isA(Giancarlo, male)
isA(Mirella, female)

The relations above are provided in Datalog, which is a declarative logic programming language that is a syntactic subset of Prolog and may be used as a query language. A Datalog program consists of a list of facts and rules (Horn clauses). Examples provided for the discussion below will also be shown using Datalog unless otherwise indicated.

Training samples forward determining a knowledge graph query of the knowledge graph are divided into two categories, positive training samples and negative training samples. The positive training samples are the following:
grandfather(Andrea, Giancarlo)
The negative training samples are the following:
grandfather(Andrea, Ilario)
grandfather(Mirella, Giancarlo)

The positive and negative training samples above may be referred to as the grandfather training samples. Using the knowledge graph of FIG. 1 and the training samples provided above a knowledge graph query computed according to some embodiments would be the following:
grandfather(X, Y):—parent(X, Z0), parent(Z0, Y), isA(X, male)

The knowledge graph query may be in the form of a rule having two parts: the consequent (shown above: grandfather (X, Y)) and the antecedent (shown above: parent(X, Z0), parent(Z0, Y), isA(X, male)). Hence, the consequent appears before the ":—" operator and the antecedent appears after the ":—" operator. The ":—" is used to divide the consequent and the antecedent and specify that what is true for the antecedent will also be true for the consequent. The knowledge graph query may be translated into a database specific implementation for execution.

A method for determining a knowledge graph query of the knowledge graph, having a response conforming to (i.e., matching) the training samples above may be carried out in four parts:

1. Developing the final metarule. The final metarule describes what the knowledge graph query will look like, i.e., the structure (e.g., relations and their contents) of the knowledge graph query. With a test metarule, the knowledge graph is queried in order to check whether the test metarule matches the training samples (i.e., all positive training samples are in the results and no negative training samples are in the results).
2. Platform specific query computation. The final metarule is used to generate at least one platform specific query. The platform specific query could be dynamically computed or stored for use as needed. The platform specific query may be implemented in Answer Set Programming (ASP) or an RDF query language. The platform specific query may provide one of the following responses:
   A. If not all of the positive training samples are matched by the query, the response is NOKP
   B. If all positive training samples are matched by the query, the response is OKP
   C. If all positive training samples are matched and all negative training samples are excluded (or pruned out), the response is in OKPN
   NOKP, OKP, and OKPN are used for ease of understanding. Other variables or numbers may also be used. For example, NOKP may be represented as 0, OKP may be represented as 1, and OKPN may be represented as 2.
3. When the two steps above are complete, the platform specific query may be executed. In particular, the platform specific query may be executed against the knowledge graph.
4. If the platform specific query produces OKPN as a response, the platform specific query is used to compute the knowledge graph query (i.e., the final model or program). The knowledge graph query can be executed against the knowledge graph upon request to produce a response conforming to the training samples.

Advantageously, the platform specific query does not return a binary response, but instead returns 3 different responses. The categorization into NOKP, OKP, and OKPN may be advantageous, because the responses can be used to efficiently develop the test metarule (i.e., guide the search for the final metarule). Accordingly, an attempt is made to match the positive samples (i.e., positive training samples) first by avoiding queries that will return NOKP. When OKP is returned, following metarules may be made progressively more restrictive until one of the limits for variables is reached. This approach may minimize the number of queries to the knowledge graph (i.e., minimize iterative querying of the knowledge graph using the test metarule), making it more efficient than other ILP methods.

Introduction to Metarules and their Use

A metarule may be a list of symbols that represents the structure of a query that will be run (i.e. executed) against the knowledge graph. The metarule may be applicable to different implementations and databases. In particular, the metarule may be used as a basis for computing the platform specific query.

One or more of the following four types of symbols may be used in the metarules, where a symbol index "n" is a positive integer that is incremented for each distinct symbol in order to distinguish similar symbols from each other:
1. Rn: relation variables (also referred to as predicate variables). In the knowledge graph query, they may be replaced by relations from the knowledge graph. This may be carried out by determining knowledge graph relations that conform to a metarule (e.g., the current test metarule).
2. Xn: names for variables identified from the training samples. Identified variable X0 may be replaced by X and identified variable X1 may be replaced by Y in the knowledge graph query. The replacement may be carried out in the interest of naming conformity.
3. Zn: intermediate (i.e., temporary) variables. These variables may be used to implement joins between relations in the knowledge graph, e.g., joins of identified variables to each other or identified variables with constants.
4. An: constants. The constants may be replaced by a node name (i.e., node property) from the knowledge graph in the knowledge graph query.

In the grandparent example above, the final (matching) metarule is
R0, X0, Z0, R1, Z0, X1, R2, X0, A0
where R0, R1 are replaced with the relation "parent", R2 is replaced with the relation "isA", X0 is replaced with "X" and X1 is replaced with "Y" and A0 is replaced with "male" for constructing the antecedent parent(X, Z0), parent(Z0, Y), isA(X, male), as shown above.

The search (i.e., iterative querying of the knowledge graph) may be guided by the following strategy: find the most unrestrictive (i.e. the simplest or least restrictive) metarule (i.e., test metarule) that matches the positive training samples first. In this way, the most permissive final metarule with the fewest joins can be determined. Since joins in the final metarule are reflected in the knowledge graph query and joins are computationally demanding, this strategy may lead to a more efficient knowledge graph query. Put another way, the strategy above may limit the number of intermediate variables in the knowledge graph query, thereby resulting in a more efficient knowledge graph query.

In the interest of conciseness, the following will express relations as pairs of symbols, omitting the Rn relation variables. For example, R0, X0, Z0 will be expressed as X0, Z0 and R2, X0, A0 will be expressed as X0, A0.

The search may end when a test metarule matches all the positive training samples while excluding all the negative training samples (i.e., a corresponding query returns OKPN).

If a query of the knowledge graph using the test metarule returns a partial match (i.e., OKP), relations may be added to the test metarule to exclude negative training samples, while maintaining the positive training samples, until one of the limits for variables is reached. In other words, if the test metarule matches all the positive training samples but fails to exclude the negative training samples (response is OKP), development of the test metarule will be controlled such that restrictions to the variables present in the test metarule are added to the test metarule and those restrictions get progressively more complex; such restrictions are added until one of the limits for variables is reached.

In the examples that follow, relations of the knowledge graph are assumed to have 2 arguments (an arity of 2), i.e., the relations are binary. However, a knowledge graph may have relations with arbitrary arity, and corresponding binary relations may be obtained from the knowledge graph via reification, without losing information. Reification is known and described in "The Semantics of Reifying N-ary Relationships as Classes", Mohamed Dahchour and Alain Pirotte, Université catholique de Louvain. Accordingly, there may be one variable (X) or two variables (X, Y) in the platform specific query. The one variable query may be used to find all values in the knowledge graph associated with a constant. For example, a one variable query might be isA(X, reflex camera)

which could be used to find all nodes in a corresponding knowledge graph with the "reflex camera" property, i.e., to find all the subjects of the isA relation when the object is "reflex camera".

Development of the platform specific query and its corresponding final metarule may follow similar approaches for both a case in which the training samples have only one variable (training samples with arity 1) and a case in which the training samples have two variables (training samples with arity 2). The approach for a two variable test metarule may extend the approach for a one variable test metarule since a goal of the search in the two variable case is to find at least one relation that describes a relationship between the two variables. In contrast, it does not make sense to find a relationship between multiple variables when the training samples only have one variable. Accordingly, in the following, a two variable test metarule will be described with respect to a head and a tail, whereas a one variable test metarule will only be described with respect to a tail.

Metarules for Two Variables

Techniques described in this section may be used when two variables are identified from the training samples. The test metarule may be initialized with a first relation in which the identified variables are adjacent. Relations that put progressively greater distance between the identified variables will then be added to the test metarule. For example, Attempt 1: [X0, X1]
Attempt 2: [X0, Z0, Z0, X1]
Attempt 3: [X0, Z0, Z0, Z1, Z1, X1]
. . .

Accordingly, the first relation of the test metarule is shown in Attempt 1 as [X0, X1], that is, the simplest solution. In other words, a single predicate relates the identified variables X0 and X1. The test metarule becomes increasingly complex as intermediate variables are added, thereby increasing the distance between the identified variables. A maximum number of intermediate variables and/or a maximum number of intermediate variables per identified variable may be configured.

Iteratively querying the knowledge graph using the test metarule and controlling development of the test metarule according to responses to the queries may lead to the following permutations of the identified variables with intermediate variable Z0:

[X0, X1]
[X1, X0]
[X0, Z0, Z0, X1]
[X0, Z0, X1, Z0]
[Z0, X0, Z0, X1]
[Z0, X0, X1, Z0]

To generalize the problem above, i.e., of generating permutations of the identified variables with a specified number of intermediate variables, a relates function may be used.

The relates function may be defined as follows: relates (first, last, numberHops) where first and last are names (e.g., X0, X1) of the identified variables and numberHops is the maximum number of intermediate variables (i.e., the maximum distance between the two variables by intermediate variables Zn). The permutations above would be returned by relates(X0, X1, 1). The relates function may correspond to a headJoiner function, described in detail below, although the parameters of the functions differ. An call to headJoiner equivalent to relates(X0, X1, 1) would be headJoiner(x0, x1, 0, 2).

Metarules for One or Two Identified Variables

Techniques described in the section may be used when one or two variables are identified from the training samples.

These techniques may be used to restrict one of the variables in the test metarule, e.g., when OKP is returned as a response during iterative querying of the knowledge graph using the test metarule. In the following example, a query of the knowledge graph using test metarule [X0, Z0, Z0, X1] returns OKP. Accordingly, controlling the development of the test metarule comprises adding a new relation [X0, A0] to the test metarule, so that the test metarule will be [X0, Z0, Z0, X1, X0, A0, X1, A1]. Hence, development of the test metarule may result in the addition of gradually more complex restrictions and adding relations to the test metarule when there is a partial match (i.e., OKP is returned as a response). Intermediate variables may be needed in order to find a final metarule that can be used to query the knowledge graph and returns a response of OKPN.

As an example, if the test metarule is [X0, Z0, Z0, X1] and iterative querying of the knowledge graph results in a response of OKP three times, development of the test metarule may be controlled such that restrictions are added to each of the variables as follows:

[X0, Z0, Z0, X1]→OKP

[X0, Z0, Z0, X1, X0, A0]→OKP

[X0, Z0, Z0, X1, X0, A0, X1, A1]→OKP

[X0, Z0, Z0, X1, X0, A0, X1, A1, Z0, A2]→OKPN

The un-highlighted portions of the test metarules shown above may be referred to as the metarule head and the highlighted portions may be referred to as metarule tails, where restrictions to each variable are highlighted in a different shade of grey. The tails could be expressed as a list of columns (where each column is also a list) and the resulting rows (the test metarule used to query the knowledge graph) are their cartesian product. Highlighting may be used similarly below.

The cartesian product of two columns (Col1 and Col2) to produce a row can be seen in the following example:

| | Col1 | Col2 |
|---|---|---|
| 1. | X0, X1 | X0, A0 |
| 2. | X1, X0 | A0, X0 |
| 3. | X0, Z0, Z0, X1 | X0, Z1, Z1, A0 |
| | . . . | |
| | Cartesian product (rows): | |
| 1. | X0, X1, X0, A0 | |
| 2. | X0, X1, A0, X0 | |
| 3. | X0, X1, X0, Z1, Z1, A0 | |
| | X1, X0, X0, A0 | |
| | X1, X0, A0, X0 | |
| | . . . | |

In the example above, each row under "Cartesian Product" (1-3) represents the cartesian product of Col1 and Col2 at the corresponding number.

A column may be computed by calling the relates function on two symbols. A first column, shown above colored the lightest shade of gray, could be computed using relates(X0, A0, n), while a second column, shown colored a middle shade of gray, could be computed by calling relates(X1, A1, n), where n refers to a maximum number of intermediate variables and is configurable. The function tail(init,maxRestrictionVars, maxHops, maxTotalRestrictions)

may generate a list of columns based on its arguments. The arguments of tail( ) are the following:
- init: identified variables
- maxRestrictionVars: maximum number of restrictions per variable
- maxHops: maximum number of intermediate variables
- maxTotalRestrictions: maximum (total) number of restrictions.

The tail function corresponds to the ClauseCol class, which is described in detail below.

Arguments preceded by "max" may be considered limits for variables. When OKP is returned as a response to queries using the test metarule, variables in the test metarule may be restricted until one of the following two conditions occurs:
- a maximum number of restrictions is reached,
- all variables (intermediate variables and identified variables) have been restricted according to the maximum number of restrictions per variable.

For example, when the maximum number of restrictions is reached, controlling the development of the test metarule may comprise switching at least one of the relations of the test metarule. In other words, the test metarule may be reverted to the most recent previous test metarule and further restrictions may be added to the most recent previous test metarule. If this is not possible, the test metarule may be reverted to the next most recent previous test metarule in order to attempt to further restrict that test metarule.

For example, the tail function may be called with a single variable, as follows: tail([X0], 1, 2, 5). In this example, OKP is returned as a response for each query of the knowledge graph using the test metarule. Accordingly, the test metarule may develop as follows:

X0, A0
A0, X0
X0, Z0, Z0, A0
X0, Z0, Z0, A0, Z0, A1
X0, Z0, Z0, A0, Z0, A1, Z0, A2
X0, Z0, Z0, A0, Z0, A1, A2, Z0
X0, Z0, Z0, A0, Z0, A1, Z0, Z1, Z1, A2
X0, Z0, Z0, A0, Z0, A1, Z0, Z1, A2, Z1
X0, Z0, Z0, A0, Z0, A1, Z1, Z0, Z1, A2
X0, Z0, Z0, A0, Z0, A1, Z1, Z0, A2, Z1
X0, Z0, Z0, A0, A1, Z0
X0, Z0, Z0, A0, A1, Z0, Z0, A2
X0, Z0, Z0, A0, A1, Z0, A2, Z0
X0, Z0, Z0, A0, A1, Z0, Z0, Z1, Z1, A2
X0, Z0, Z0, A0, A1, Z0, Z0, Z1, A2, Z1
X0, Z0, Z0, A0, A1, Z0, Z1, Z0, Z1, A2
X0, Z0, Z0, A0, A1, Z0, Z1, Z0, A2, Z1
X0, Z0, Z0, A0, Z0, Z1, Z1, A1
X0, Z0, Z0, A0, Z0, Z1, A1, Z1
X0, Z0, Z0, A0, Z1, Z0, Z1, A1
X0, Z0, Z0, A0, Z1, Z0, A1, Z1
X0, Z0, A0, Z0
X0, Z0, A0, Z0, Z0, A1
X0, Z0, A0, Z0, Z0, A1, Z0, A2
X0, Z0, A0, Z0, Z0, A1, A2, Z0
X0, Z0, A0, Z0, Z0, A1, Z0, Z1, Z1, A2
X0, Z0, A0, Z0, Z0, A1, Z0, Z1, A2, Z1
X0, Z0, A0, Z0, Z0, A1, Z1, Z0, Z1, A2
X0, Z0, A0, Z0, Z0, A1, Z1, Z0, A2, Z1
X0, Z0, A0, Z0, A1, Z0
X0, Z0, A0, Z0, A1, Z0, Z0, A2
X0, Z0, A0, Z0, A1, Z0, A2, Z0
X0, Z0, A0, Z0, A1, Z0, Z0, Z1, Z1, A2
X0, Z0, A0, Z0, A1, Z0, Z0, Z1, A2, Z1
X0, Z0, A0, Z0, A1, Z0, Z1, Z0, Z1, A2
X0, Z0, A0, Z0, A1, Z0, Z1, Z0, A2, Z1
X0, Z0, A0, Z0, Z0, Z1, Z1, A1
X0, Z0, A0, Z0, Z0, Z1, A1, Z1
X0, Z0, A0, Z0, Z1, Z0, Z1, A1
X0, Z0, A0, Z0, Z1, Z0, A1, Z1
Z0, X0, Z0, A0
Z0, X0, Z0, A0, Z0, A1
Z0, X0, Z0, A0, Z0, A1, Z0, A2
Z0, X0, Z0, A0, Z0, A1, A2, Z0
Z0, X0, Z0, A0, Z0, A1, Z0, Z1, Z1, A2
Z0, X0, Z0, A0, Z0, A1, Z0, Z1, A2, Z1
Z0, X0, Z0, A0, Z0, A1, Z1, Z0, Z1, A2
Z0, X0, Z0, A0, Z0, A1, Z1, Z0, A2, Z1
Z0, X0, Z0, A0, A1, Z0
Z0, X0, Z0, A0, A1, Z0, Z0, A2
Z0, X0, Z0, A0, A1, Z0, A2, Z0
Z0, X0, Z0, A0, A1, Z0, Z0, Z1, Z1, A2
Z0, X0, Z0, A0, A1, Z0, Z0, Z1, A2, Z1
Z0, X0, Z0, A0, A1, Z0, Z1, Z0, Z1, A2
Z0, X0, Z0, A0, A1, Z0, Z1, Z0, A2, Z1
Z0, X0, Z0, A0, Z0, Z1, Z1, A1
Z0, X0, Z0, A0, Z0, Z1, A1, Z1
Z0, X0, Z0, A0, Z1, Z0, Z1, A1
Z0, X0, Z0, A0, Z1, Z0, A1, Z1
Z0, X0, A0, Z0
Z0, X0, A0, Z0, Z0, A1
Z0, X0, A0, Z0, Z0, A1, Z0, A2
Z0, X0, A0, Z0, Z0, A1, A2, Z0
Z0, X0, A0, Z0, Z0, A1, Z0, Z1, Z1, A2
Z0, X0, A0, Z0, Z0, A1, Z0, Z1, A2, Z1
Z0, X0, A0, Z0, Z0, A1, Z1, Z0, Z1, A2
Z0, X0, A0, Z0, Z0, A1, Z1, Z0, A2, Z1
Z0, X0, A0, Z0, A1, Z0
Z0, X0, A0, Z0, A1, Z0, Z0, A2
Z0, X0, A0, Z0, A1, Z0, A2, Z0
Z0, X0, A0, Z0, A1, Z0, Z0, Z1, Z1, A2
Z0, X0, A0, Z0, A1, Z0, Z0, Z1, A2, Z1
Z0, X0, A0, Z0, A1, Z0, Z1, Z0, Z1, A2
Z0, X0, A0, Z0, A1, Z0, Z1, Z0, A2, Z1
Z0, X0, A0, Z0, Z0, Z1, Z1, A1
Z0, X0, A0, Z0, Z0, Z1, A1, Z1
Z0, X0, A0, Z0, Z1, Z0, Z1, A1
Z0, X0, A0, Z0, Z1, Z0, A1, Z1

In case of the single identified variable (e.g., X0), constraints may be added to X0 in the form of constants and intermediate variables, as shown above.

When forming columns (i.e., restricting one of the variables in the test metarule), not only are identified variables (e.g., X0) used, but also intermediate variables (e.g., Z0, Z1) present in the current row (i.e. the current test metarule). For example, the following is a legitimate metarule:

X0, A0, X0, Z0, Z0, A1, Z0, A2

As shown above, a new column (Z0, A2) does not refer to the identified variable X0 but instead refers to the middle column (X0, Z0, Z0, A1) where there is a Z0. Hence, the new column restricts one of the variables in the test metarule, i.e., the intermediate variable Z0.

When restricting one of the variables in the test metarule (e.g., when OKP is returned as a response and none of the limits for variables has been reached), restrictions may be added in the following order:
1. Identified variables Xn, with progressively increasing "n" (i.e., starting with X0, then X1)

2. Intermediate variables Zn, with progressively increasing "n"

Each variable may be restricted once, before another variable is restricted more than once. Hence, no variable may be restricted more than once more than any other variable. Accordingly, variables with fewer restrictions in the test metarule may be restricted before variables with more restrictions in the test metarule. For example, if X0 is restricted (i.e., constrained) once, then X0 cannot be restricted again until Z0 is restricted.

As indicated above, restricting an identified or intermediate variable may comprise adding a relation including the variable and a constant to the test metarule or adding a relation including two intermediate variables (one of which is already in the test metarule) to the test metarule.

According to one example consistent with the order of restrictions above, with variables X0, X1, Z0, a maximum number of restrictions per variable of 2 and a maximum number of intermediate variables per identified variable of 1, the following final metarule may be developed:

X0, A0, X1, A1, Z0, A3, X0, A4, X1, A5, Z0, A6

Within each metarule, the symbol index (n) increases for each identified variable (Xn), and constant (An), as shown above. The symbol index (n) also increases for each intermediate variable (Zn), as shown below.

Further Developing Metarules for Two Identified Variables

The following describes further techniques for use when two variables are identified from the training samples.

In case two variables are identified from the training samples, a binary function may be used. The binary function may appear as follows:

binary(maxHopsHead, maxHopsTail, maxRestrictionVars, maxTotalRestriction)

The arguments of the binary function may be defined as follows:

maxHopsHead is the maximum number of intermediate variables per identified variable maxHopsTail is the maximum number of intermediate variables defined for the tail function discussed above maxRestrictionVars is the maximum number of restrictions per variable and is applicable to the tail function maxTotalRestriction defines a maximum number of restrictions (total) and considers both the tail function and the relates function Accordingly, a call to binary(1, 2, 1, 5) where it is assumed that the query using the test metarule returns OKP, the test metarule would develop as follows:

X0, X1
X0, X1, X0, A0
X0, X1, X0, A0, X1, A1
X0, X1, X0, A0, A1, X1
X0, X1, X0, A0, X1, Z0, Z0, A1
X0, X1, X0, A0, X1, Z0, A1, Z0
X0, X1, X0, A0, Z0, X1, Z0, A1
X0, X1, X0, A0, Z0, X1, A1, Z0
X0, X1, A0, X0
X0, X1, A0, X0, X1, A1
X0, X1, A0, X0, A1, X1
X0, X1, A0, X0, X1, Z0, Z0, A1
X0, X1, A0, X0, X1, Z0, A1, Z0
X0, X1, A0, X0, Z0, X1, Z0, A1
X0, X1, A0, X0, Z0, X1, A1, Z0
X0, X1, X0, Z0, Z0, A0
X0, X1, X0, Z0, Z0, A0, Z0, A1
X0, X1, X0, Z0, Z0, A0, A1, Z0
X0, X1, X0, Z0, Z0, A0, Z0, Z1, Z1, A1
X0, X1, X0, Z0, Z0, A0, Z0, Z1, A1, Z1
X0, X1, X0, Z0, Z0, A0, Z1, Z0, Z1, A1
X0, X1, X0, Z0, Z0, A0, Z1, Z0, A1, Z1
X0, X1, X0, Z0, A0, Z0
X0, X1, X0, Z0, A0, Z0, Z0, A1
X0, X1, X0, Z0, A0, Z0, A1, Z0
X0, X1, X0, Z0, A0, Z0, Z0, Z1, Z1, A1
X0, X1, X0, Z0, A0, Z0, Z0, Z1, A1, Z1
X0, X1, X0, Z0, A0, Z0, Z1, Z0, Z1, A1
X0, X1, X0, Z0, A0, Z0, Z1, Z0, A1, Z1
X0, X1, Z0, X0, Z0, A0
X0, X1, Z0, X0, Z0, A0, Z0, A1
X0, X1, Z0, X0, Z0, A0, A1, Z0
X0, X1, Z0, X0, Z0, A0, Z0, Z1, Z1, A1
X0, X1, Z0, X0, Z0, A0, Z0, Z1, A1, Z1
X0, X1, Z0, X0, Z0, A0, Z1, Z0, Z1, A1
X0, X1, Z0, X0, Z0, A0, Z1, Z0, A1, Z1
X0, X1, Z0, X0, A0, Z0
X0, X1, Z0, X0, A0, Z0, Z0, A1
X0, X1, Z0, X0, A0, Z0, A1, Z0
X0, X1, Z0, X0, A0, Z0, Z0, Z1, Z1, A1
X0, X1, Z0, X0, A0, Z0, Z0, Z1, A1, Z1
X0, X1, Z0, X0, A0, Z0, Z1, Z0, Z1, A1
X0, X1, Z0, X0, A0, Z0, Z1, Z0, A1, Z1
X1, X0
X1, X0, X0, A0
X1, X0, X0, A0, X1, A1
X1, X0, X0, A0, A1, X1
X1, X0, X0, A0, X1, Z0, Z0, A1
X1, X0, X0, A0, X1, Z0, A1, Z0
X1, X0, X0, A0, Z0, X1, Z0, A1
X1, X0, X0, A0, Z0, X1, A1, Z0
X1, X0, A0, X0
X1, X0, A0, X0, X1, A1
X1, X0, A0, X0, A1, X1
X1, X0, A0, X0, X1, Z0, Z0, A1
X1, X0, A0, X0, X1, Z0, A1, Z0
X1, X0, A0, X0, Z0, X1, Z0, A1
X1, X0, A0, X0, Z0, X1, A1, Z0
X1, X0, X0, Z0, Z0, A0
X1, X0, X0, Z0, Z0, A0, Z0, A1
X1, X0, X0, Z0, Z0, A0, A1, Z0
X1, X0, X0, Z0, Z0, A0, Z0, Z1, Z1, A1
X1, X0, X0, Z0, Z0, A0, Z0, Z1, A1, Z1
X1, X0, X0, Z0, Z0, A0, Z1, Z0, Z1, A1
X1, X0, X0, Z0, Z0, A0, Z1, Z0, A1, Z1
X1, X0, X0, Z0, A0, Z0
X1, X0, X0, Z0, A0, Z0, Z0, A1
X1, X0, X0, Z0, A0, Z0, A1, Z0
X1, X0, X0, Z0, A0, Z0, Z0, Z1, Z1, A1
X1, X0, X0, Z0, A0, Z0, Z0, Z1, A1, Z1
X1, X0, X0, Z0, A0, Z0, Z1, Z0, Z1, A1
X1, X0, X0, Z0, A0, Z0, Z1, Z0, A1, Z1
X1, X0, Z0, X0, Z0, A0
X1, X0, Z0, X0, Z0, A0, Z0, A1
X1, X0, Z0, X0, Z0, A0, A1, Z0
X1, X0, Z0, X0, Z0, A0, Z0, Z1, Z1, A1
X1, X0, Z0, X0, Z0, A0, Z0, Z1, A1, Z1
X1, X0, Z0, X0, Z0, A0, Z1, Z0, Z1, A1
X1, X0, Z0, X0, Z0, A0, Z1, Z0, A1, Z1
X1, X0, Z0, X0, A0, Z0
X1, X0, Z0, X0, A0, Z0, Z0, A1
X1, X0, Z0, X0, A0, Z0, A1, Z0
X1, X0, Z0, X0, A0, Z0, Z0, Z1, Z1, A1
X1, X0, Z0, X0, A0, Z0, Z0, Z1, A1, Z1
X1, X0, Z0, X0, A0, Z0, Z1, Z0, Z1, A1
X1, X0, Z0, X0, A0, Z0, Z1, Z0, A1, Z1

The binary function corresponds to the TwoVarHeadCol function, described in detail below. A first column returned by TwoVarHeadCol may include all permutations of x0 and x1. When nextCol is invoked on TwoVarHeadCol, nextCol may return an instance of ClauseCol. ClauseCol corresponds to the tail function described above. In particular, ClauseCol represents a single column in the tail. In case of a single variable (e.g., X0), ClauseCol may also be the first column, since it may add constraints to any given identified variable (X) or temporary variable (Z).

Switching Relations Following NOKP

Changing one or more parameters of the binary function, the tail function, or the relates function may result in exponential growth of the number of test metarules. The number of test metarules used to query the knowledge graph may be reduced by excluding cases that cannot return OKPN. This is achieved by rolling back addition of at least one relation from the test metarule, i.e., switching at least one of the relations of the test metarule. In other words, metarules whose ancestors (i.e., base metarules with fewer relations) do not even return OKP cannot return OKPN and can therefore be excluded.

Hence, if a query of the knowledge graph using the test metarule returns NOKP, controlling the development of the test metarule may include rolling back addition of (switching) at least one relation from the test metarule. Accordingly, when a next test relation from a plurality of relations includes a permutation of one of the relations in the test metarule that has not yet been tried, the one of the relations may be switched with the next test relation. This is shown in the following:

1. [X0, Z0, Z0, X1]→OKP
2. [X0, Z0, Z0, X1, X0, A0]→OKP
3. [X0, Z0, Z0, X1, X0, A0, X1, A1]→NOKP
4. [X0, Z0, Z0, X1, X0, A0, A1, X1]→NOKP
5. [X0, Z0, Z0, X1, X0, A0, X1, Z1, Z1, A1]→NOKP
6. [X0, Z0, Z0, X1, A0, X0]→OKP
7. [X0, Z0, Z0, X1, A0, X0, X1, A1]→OKP
8. [X0, Z0, Z0, X1, A0, X0, X1, A1, Z0, A2]→NOKP
9. [X0, Z0, Z0, X1, A0, X0, X1, A1, A2, Z0]→OKPN

In line 3, NOKP is returned. Accordingly, it does not make sense to further restrict one of the variables in the test metarule since any further restrictions added to the metarule of line 3 (without rolling back or switching) will also result in NOKP. Instead, addition of the relation (X1, A1) is rolled back. This can be seen in line 4, where the relation (X1, A1) is no longer present. In other words, line 4 shows that the relation (X1, A1) from line 3 has been switched with one or more corresponding relations from the plurality of relations. In this case, the corresponding relations are one relation, i.e., (A1, X1).

Similarly, in line 4 NOKP is returned. Accordingly, the addition of relation (A1, X1) is rolled back in line 5. In other words, line 5 shows that the relation (A1, X1) has been switched with two new relations (X1, Z1) and (Z1, A1), i.e., a join. The join of line 5 includes a first relation (X1, Z1) having one of the identified variables in the test metarule and one of the intermediate variables not in the test metarule (Z1). The join of line 5 also includes a second relation having the intermediate variable not in the test metarule (Z1) and one of the constants (included in the symbols) not in the test metarule (A1).

In line 8, NOKP is also returned. Accordingly, the addition of relation (Z0, A2) is rolled back in line 9. Line 9 shows that the relation (Z0, A2) is switched with new relation (A2, Z0) having the same intermediate variable (Z0) and constant (A2), but in a different permutation. This in turn leads to a response of OKPN when the test metarule of line 9 is used to query the knowledge graph.

In this way, it is possible to minimize queries to the knowledge graph.

Functions for Developing the Final Metarule

The following relates to functions that can be used to iteratively query the knowledge graph using the test metarule and control development of the test metarule in order to arrive at the final metarule. These functions may be used in addition to or alternatively to functions discussed above. The functions are provided in pseudocode for ease of understanding.

An interface RowCol exposes the test metarule in a variable, track, and also exposes two methods, nextCol and nextRow, both of which return another RowCol object. nextCol may be invoked when OKP is returned and none of the limits for variables has been reached. nextRow may be invoked when NOKP is returned or one of the limits for variables has been reached.

For example,
   val rc=doubleVarRowCol(maxTotalHops=3, hopsVarHead=1, hopsVarBody=0, numRestrictionPerVar=1)
   rc.track=[X0, X1]

Accordingly, the variable rc is a RowCol object for which the maximum number of intermediate variables is 3, a maximum number of intermediate variables for the head (i.e., for restricting one of the variables in the test metarule when OKP is returned as a response) is 1, a maximum number of intermediate variables for the tail/body is 0 and the maximum number of restrictions per variable is 1. rc.track shows the current contents of the test metarule.

If rc.track returns OKP then
   val rc2=rc.nextCol
   rc2.track=[X0, X1, X0, A0]

Otherwise, if rc.track returns NOKP then both of the relations in the test metarule (shown in rc2.track) are switched with a next test relation (i.e., a permutation of X0, X1), as shown below:
   val rc3=rc.nextRow
   rc3.track=[X1, X0]

Hence, X0, X1, X0, A0 is switched with a permutation of X0,X1, i.e., X1,X0. When there is no next test relation in the plurality of relations, nextRow (and also nextCol) returns none, which means no answer can be found and querying ends without finding a final metarule.

A column may be generated via the headJoiner function of the TwoVarHeadCol class or via the buildCols function of the ClauseCol class. The buildCols function relies on the headJoiner function. The headJoiner function corresponds to the relates function. The column may be defined as the permutations of two symbols and a predetermined maximum number of intermediate variables. The two symbols may be identified variables, intermediate variables or constants. Columns are shown above using different shades of gray.

Accordingly, using the RowCol interface, when a column is created a list of permutations for the two symbols of the column (e.g., X0-X1, X-An, Zn-An) may be passed to the object constructor. The track variable includes the head (first permutation) of the list of permutations.

After a call to the nextRow method, a new RowCol object is initialized with the tail of the list of permutations, where the tail is the rest of the list of permutations without the head of the list of permutations. The list of permutations corresponds to the plurality of relations.

After a call to the nextCol method, a new column (i.e., a new list of permutations) is created as a new RowCol object and a track variable of the new RowCol object will have a value of the calling RowCol object's track variable concatenated with the head of the calling RowCol object's list of permutations (i.e., the head of the calling RowCol object's cols list). A cols list of the new RowCol object is created using the variables (identified and intermediate) in the test metarule (as provided in the track variable) that still have a maximum number of available occurrences (see the varOccurrences variables below) and one of the constants An, where "n" is an index value used to distinguish different constants (as discussed above). Accordingly, the object RowCol is recursive.

The track variable corresponds to the test metarule. If there are no permutations in the list of permutations (cols list) for the current RowCol object, the nextRow method will be invoked on the list of permutations of the previous RowCol object. In this way, it is possible to ensure that metarules which might return OKPN are checked after NOKP is returned as a response to a query using the test metarule. The lists of permutations (cols lists) referred to above may be collectively referred to as the plurality of relations. Comments in the pseudocode below are preceded by "//"

```
//Return RowCol for a single variable metarule, e.g., carManufacturer(X)
def singleVarRowCol(maxTotalHops, hops4var, numRestrictionsPerVarBody) = new
RowCol(
    //number of hops for each identified variable
    hops4var,
    //remaining length of meta-rule is the current maxTotalHops
    remainingTotalHops = maxTotalHops,
    //there is only one variable (X0) to constrain
    varOccurrences = (X0 -> numRestrictionsPerVarBody),
    //explode all permutations between variable X0 and constant A0 with max hops
    cols = shuffle(headJoiner(X0, A0, hops4var))
    //No previous column
    previous = None)
//Return RowCol for double variable metarule, e.g., capitalOf(X, Y)
def doubleVarRowCol(maxTotalHops, hops4var, hopsVarHead,
numRestrictionsPerVarBody) = new RowCol(
    //number of hops of each variable
    hops4var,
    //the remaining length of meta-rule is the actual maxTotalHops
    remainingTotalHops = maxTotalHops,
    //there are two variables (X0, X1) to constrain
    varOccurrences = (X0 -> numRestrictionsPerVarBody, X1 ->
    numRestrictionsPerVarBody),
    //permutations between X0 and X1,
    cols = shuffle(headJoiner(X0, X1, hopsVarHead)),
    //No previous column
    previous = None)
interface RowCol {
  col: Int
  //elements in metarule are in pairs since knowledge graph arity=2
  track: List[(String, String)]// current metarule at this column
  nextCol( ): Option[RowCol]
  nextRow(): Option[RowCol]
}
//ClauseCol may be used to generate a list of columns and produces a result
//similar to the tail function discussed above
ClauseCol extends RowCol{
  hops4var:Int //num hops for any var Xn
  remainingHops:Int //remaing hops
  // for each symbol χn,Zn,An there are related remaining occurrences. With
  // A0 and 0 remaining occurrences, it would not be possible to instantiate a
  // new ClauseCol with currentVar=A0
  varOccurrences:Map[String,Int]
  currentVar:String
  cols: List[List[(String,String))
  previous:Option[RowCol]
}
//TwoVarHeadCol can be used to generate the first column in case of 2 identified
//variables
TwoVarHeadCol extends RowCol{
  numRestrictionsPerVar: Int,
  hops4VarHead: Int,
  hops4VarClause: Int,
  maxTotalPairs: Int,
  cols: List[List[(String, String)]]
}
//A first RowCol instance may be initialized using the following Initialize
//function:
Initialize(
    numVars: Int,
    hops4VarHead: Int,
    hops4VarClause: Int,
    maxTotalHops: Int,
```

```
    numRestrictionsPerVarClause: Int):Option[RowCol] =
        if(numVars == 1) then
            Some(ClauseCol(
                maxTotalHops,
                hops4VarClause,
                //remaining occurrences for X0
                Map("X0"->numRestrictionPerVarClause-1)
                "X0", //this column add restrictions for X0
                buildCols("X0", [ ], hops4VarClause),
                None,
            ))
        else if (numVars == 2)
            Some(TwoVarHeadCol(
                numRestrictionsPerVarClause,
                hops4VarHead,
                hops4VarClause,
                maxTotalHops,
                shuffle(headJoiner("x0","x1",0,hops4VarHead))
            ))
        else None //assumes there are 1 or 2 identified variables
```

In case of 2 identified variables (e.g., X0 and X1) a TwoVarHeadCol object may be returned. The TwoVarHeadCol object includes a first list, which provides relationships between the two identified variables, e.g., X0 and X1. ClauseCol may be invoked for each column in the tail. Accordingly, in the case of two identified variables, the metarule head and the metarule tail may be returned. In contrast, in the case of a single identified variable (e.g., X0) only ClauseCol may be returned. TwoVarHeadCol is not invoked with a single identified variable (i.e., there is no metarule head for a single identified variable) because the single identified variable does not have to relate to any other identified variables; the single variable need only be related to intermediate variables and constants.

The relates function described above produces results corresponding to those of the headJoiner function described below.

The buildCols function creates a list of all permutations between given variable (variableName) and a constant. The second argument is used to introduce an index for the constants (e.g., An) and intermediate variables (Zn), where "n" represents an incremented index. Accordingly, buildCols invokes headJoiner with the following arguments: the variableName buildCols receives as an argument, a next index for a constant (A) and a next index for an intermediate variable (Z), as follows:

```
buildCols: (variableName, track, hops) =>
    headJoiner(
        variableName,
        nextElementName(track, "A"), //index for constant
        nextElementName(track, "Z").drop(1).toInt, //index for
            intermediate var hops
    ).flatMap(shuffle)
//In TwoVarHeadCol invoking nextRow will return the same class
nextRow( ): Option[RowCol] = cols match {
    case head :: Nil => None
    case head :: next =>
        Some(
            new TwoVarHeadCol(
                numRestrictionsPerVar,
                hops4VarHead,
                hops4VarClause,
                maxTotalPairs,
                next
            )
        )
    }
}
```

```
//In contrast to NextRow, nextCol calls ClauseCol, because the following
//column will be part of the metarule tail:
nextCol( ): Option[RowCol] = ClauseCol(
    maxTotalPairs - track.size,
    hops4VarClause,
    track
        .flatMap(_.map(_.toString( )))
        .filter(p => p.startsWith("X") || p.startsWith("Z"))
        .map(p => (p -> numRestrictionsPerVar))
        .toMap,
    Some(this)
)
//The invocation of ClauseCol in nextCol will cause ClauseCol to return
an
//instance of itself
nextCol( ): Option[RowCol] = {
    val nhops = remainingHops - cols.head.size
    if (nhops <= 0) nextRow( )
    else {
        val newOccurrences =
            varOccurrences ++ missingVar(varOccurrences, track, hops4var)
        nextVarF(newOccurrences)
            .map(nextVar => {
                new ClauseCol(
                    hops4var,
                    nhops,
                    nextVar._2,
                    nextVar._1,
                    buildCols(nextVar._1, track, hops4var),
                    Some(this)
                )
            })
            .orElse(nextRow( ))
    }
}
//The nextRow function in ClauseCol returns a new instance of ClauseCol
//without the first element of the cols list
nextRow( ): Option[RowCol] = cols match
    //if NOKP is returned as a response, carry out a switch by going to the
    //previous RowCol and invoking nextRow
    case top :: Nil => prev.flatMap(_.nextRow( ))
    case top :: remainingCols =>
        Some(
            new ClauseCol(
                hops4var,
                remainingHops,
                varOccurrences,
                varr,
                remainingCols,
                prev
            )
        )
```

As shown in the comments below, for TwoHeadVarCol, the track variable of the RowCol interface will be the top element of the cols variable of TwoHeadVarCol, while for ClauseCol the track variable will be the concatenation of the previous instance of RowCol (linked to by prev) and the first element of the cols variable of ClauseCol.

```
//TwoVarHeadCol
// track = cols.head
//ClauseCol
// track = prev.map(_.track).map(_ ::: cols.head).getOrElse(cols.head)
```

Generating One or More Platform Specific ASP Queries from the Final Metarule

Once the final metarule has been developed, the final metarule may be used to compute the knowledge graph query. As an intermediate step, one or more platform specific queries may be generated from the final metarule. In the following, the platform specific query will be represented in Answer Set Programming (ASP). An ASP program is self-descriptive and can be translated into a program executable on a specific database (e.g., SparQL).

The following example applies to the knowledge graph of FIG. 1 and the training samples including the grandfather relations described above. Accordingly, the final metarule (including Rn variables) is

[R0, X0, Z0, R1, Z0, X1, R2, X0, A0]

From the final metarule above, the platform specific query in ASP would include the following 4 lines:

1. 1 {rel(P,R0,R1,R2,A0)}1:—pos(P,X,Y), R0(X,Z0), R1(Z0,Y), R2(X,A0)
2. :—pos(P,X,Y), rel(P,R0,R1,R2,A0), not(R0(X,Z0), R1(Z0,Y), R2(X,A0))
3. :—rel(P,R0,R1,R2,A0), R0(X,Z0), R1(Z0,Y), R2(X, A0), neg(P,X,Y)
4. cons(P,X,Y), ant(P,R0,X,Z0), ant(P,R1,Z0,Y), ant(P, R2,X,A0):—rel(P,R0,R1,R2,A0)

In the ASP query above, positive training samples are prefixed with "pos". Further, a knowledge base may be established including the training samples (the positive and negative specified as the grandfather relations above) and the knowledge graph, as shown in FIG. 1. Accordingly, the initial positive training sample, grandfather (Andrea, Giancarlo) will be converted into pos(grandfather, Andrea, Giancarlo) and inserted into the knowledge base. Similarly, the negative samples grandfather(Andrea, Ilario) and grandfather(Mirella, Giancarlo) will be converted into neg(grandfather, Andrea, Ilario) and neg(grandfather, Mirella, Giancarlo) respectively, and inserted into the knowledge base.

Line 1 above generates new predicates, "rel", which are the product of the final metarule and the positive samples. Line 1 will generate a number of solutions corresponding to the number of occurrences of the rel predicate; hence, there is only a single rel predicate in the platform specific query.

Lines 2 and 3 prune (filter out) solutions that do not match all of the positive training samples, NOKP, and solutions that do not exclude (filter out) all of the negative training samples, OKP. Line 2 filters out solutions that do not match all positive training samples. Line 2 functions as follows: if there is at least one pos predicate that matches the criteria not(R0(X,Z0), R1(Z0,Y), R2(X,A0)) on a given occurrence of the rel predicate of line 1, that solution will be filtered out. Accordingly, if there is a positive training sample that would not be returned by the query, then the query will be discarded. In addition, line 3 filters out queries that would include negative samples. Line 4 includes predicates that may be used to compute the knowledge graph query.

A platform specific query that returns OKPN can be used as a basis for the knowledge graph query. A platform specific query that returns NOKP will be filtered out by line 2. A platform specific query that returns OKP will be filtered out by line 3.

Computing the Knowledge Graph Query from the ASP Query

The grandfather training samples and the knowledge graph shown in FIG. 1 result in the following platform specific ASP query:

cons(P,X,Y), ant(P,R0,X,Z0), ant(P,R1,Z0,Y), ant(P,R2, X,A0):—rel(P,R0,R1,R2,A0)

The consequent element of the line above, cons(P,X,Y), defines the antecedent and consequent elements of the knowledge graph query. Accordingly, continuing the example of FIG. 1, the predicates above may be filled as follows:

cons(P, X, Y) becomes cons(grandfather, X, Y)
ant(P, R0, X, Z0) becomes ant(grandfather, parent. X, Z0)
ant(P, R1, Z0, Y) becomes ant(grandfather, parent, Z0, Y)
ant(P, R2, X, A0) becomes ant(grandfather, isA, X, male)

Accordingly, the knowledge graph query may be computed from the four filled out predicates above:

grandfather(X, Y):—parent(X, Z0), parent(Z0, Y), isA(X, male)

The knowledge graph query is shown in Datalog for convenience, but can be translated into a query executable on a specific database implementation, as needed.

Generating a Platform Specific SparQL Queries from Metarules

In addition or alternatively to ASP, SparQL may be used for platform specific queries. The SparQL queries are typically supported by a graph database.

Two types of SparQL query may be implemented:
1. check, which may use a test metarule to query a knowledge graph, and return NOKP, OKP, or OKPN without returning matched relations or constants,
2. bind, which may be used to compute a knowledge graph query having a response conforming to provided training samples from a final metarule.

The following example illustrates how check and bind SparQL queries may be computed from metarules. According to the example, it is desirable to query a knowledge graph in order to find car manufacturers. The input is as follows:

positive training samples: Honda, Ford, Renault
negative training samples: number, subway, allegro
metarule: X0, A0, X0, Z0, Z0, A1, Z0, A2

In SparQL, nodes are typically expressed as uniform resource locators (URLs).

Accordingly, a node for "Honda" would be <http://a/honda>
Similarly, a node for "Ford" would be <http://a/ford>
A node for "number" would be <http://a/number>

In view of the metarule above and the samples, the check query for the metarule may have the following form:

```
select (count(*) as ?pos_res) (sum(if(?neg = true, 1, 0)) as ?neg_res){
    {select * {
        <http://a/honda> ?r0 ?A0 .
<http://a/honda> ?r1 ?Z0000 . ?Z0000 ?r2 ?A1 . ?Z0000 ?r3 ?A2 .
        <http://a/ford> ?r0 ?A0 . <http://a/ford> ?r1 ?Z0001 . ?Z0001 ?r2
        ?A1 . ?Z0001 ?r3 ?A2 .
        <http://a/renault> ?r0 ?A0 .
<http://a/renault> ?r1 ?Z0002 . ?Z0002 ?r2 ?A1 . ?Z0002 ?r3 ?A2 .
    }}
```

```
bind(exists{
    filter not exists{<http://a/number> ?r0 ?A0 .
<http://a/number> ?r1 ?Z0003 . ?Z0003 ?r2 ?A1 . ?Z0003 ?r3 ?A2 . }
    filter not exists{<http://a/subway> ?r0 ?A0 .
<http://a/subway> ?r1 ?Z0004 . ?Z0004 ?r2 ?A1 . ?Z0004 ?r3 ?A2 . }
    filter not exists{<http://a/allegro> ?r0 ?A0 .
<http://a/allegro> ?r1 ?Z0005 . ?Z0005 ?r2 ?A1 . ?Z0005 ?r3 ?A2 . }
  } as ?neg)
}
```

The select command and parameters of the check query (i.e., "select (count(*) as ?pos_res) (sum(if(?neg=true, 1, 0)) as ?neg_res){{select*{" above) may be independent of the metarule. In other words, the knowledge graph query may include a command and parameters independent of the metarule. The body of the "select" statement above (starting with "<http:") may be computed from the metarule by replacing the identified variables (Xn) with respective values from the training samples. The values are then translated into a format that is compatible with SparQL.

Similarly, "bind(exists{" and "filter not exists" may be independent of the metarule. The body of the filter statements (i.e., "{<http: . . . ") may also be computed from the metarule by replacing identified variables (Xn) with respective values from the training samples. The values are then translated into a format that is compatible with SparQL.

Regarding the check query, if the neg_res variable is greater than zero, then the response will be OKPN.

Else if the pos_res is greater than zero, then the response will be OKP.

Otherwise, the response will be NOKP.

Accordingly, iterative querying of the knowledge graph may be carried out using check queries. The metarule discussed in the context of the check query may be the test metarule and may be used to formulate the check query, as discussed above.

If the response (to the check query) is OKPN, i.e., the metarule above is a final metarule, the bind query may be executed as follows:

```
select *{
    {select *   {
        <http://a/honda> ?r0 ?A0 .
<http://a/honda> ?r1 ?Z0000 . ?Z0000 ?r2 ?A1 . ?Z0000 ?r3 ?A2 .
```

```
<http://a/ford> ?r0 ?A0 . <http://a/ford> ?r1 ?Z0001 . ?Z0001 ?r2 ?A1 . ?Z0001 ?r3 ?A2 .
<http://a/renault> ?r0 ?A0 . <http://a/renault> ?r1 ?Z0002 . ?Z0002 ?r2 ?A1 . ?Z0002 ?r3 ?A2 .
    }}
    filter not exists{<http://a/number> ?r0 ?A0 .
<http://a/number> ?r1 ?Z0003 . ?Z0003 ?r2 ?A1 . ?Z0003 ?r3 ?A2 . }
    filter not exists{<http://a/subway> ?r0 ?A0 .
<http://a/subway> ?r1 ?Z0004 . ?Z0004 ?r2 ?A1 . ?Z0004 ?r3 ?A2 . }
    filter not exists{<http://a/allegro> ?r0 ?A0 .
<http://a/allegro> ?r1 ?Z0005 . ?Z0005 ?r2 ?A1 . ?Z0005 ?r3 ?A2 . }
} limit 5
```

The bind query is computed in a manner similar to that of the check query. In particular, the select commands and parameters may be independent of the final metarule. The body of the inner select statement as well as the filter statements may be computed from the final metarule by replacing the identified variables (Xn) with respective values from the training samples. The values are then translated into a format that is compatible with SparQL.

The "limit 5" indicates that there are a maximum of 5 knowledge queries that it would be useful to obtain. Values other than 5 may also be used. The difference between the five knowledge queries is that different constants are used. From the bind query, the following relations and constants can be obtained or instantiated:

r0→isA,
A2→railroad,
r1→isA,
A1→road,
r2→relatedTo,
r3→relatedTo,
A0→company

The instantiated relations and constants (on the right side of the arrows) may be used to replace the variables in the metarule and obtain the knowledge graph query:

isA(X, car manufacturer)←isA(X, company), isA(X, Z0), relatedTo(Z0, road), relatedTo(Z0, railroad)

The metarule (for the car manufacturer example above) is reproduced here: X0,A0, X0,Z0, Z0,A1,Z0,A2 (and referred to in the context of the check and bind queries below).

From the metarule, a corresponding check query in SparQL could be formulated as follows:

```
select (count(*) as ?pos_res) (sum(if(?neg = true, 1, 0)) as ?neg_res){
    {select *   {
        <http://a/honda> ?r0 ?A0 . <http://a/honda> ?r1 ?Z0000 . ?Z0000 ?r2 ?A1 . ?Z0000 ?r3 ?A2 .
        <http://a/ford> ?r0 ?A0 . <http://a/ford> ?r1 ?Z0001 . ?Z0001 ?r2 ?A1 . ?Z0001 ?r3 ?A2 .
        <http://a/renault> ?r0 ?A0 . <http://a/renault> ?r1 ?Z0002 . ?Z0002 ?r2 ?A1 . ?Z0002 ?r3 ?A2 .
    }}
    bind(exists{
        filter not exists{<http://a/number> ?r0 ?A0 . <http://a/number> ?r1 ?Z0003 . ?Z0003 ?r2 ?A1 . ?Z0003 ?r3 ?A2 . }
        filter not exists{<http://a/subway> ?r0 ?A0 . <http://a/subway> ?r1 ?Z0004 . ?Z0004 ?r2 ?A1 . ?Z0004 ?r3 ?A2 . }
        filter not exists{<http://a/allegro> ?r0 ?A0 . <http://a/allegro> ?r1 ?Z0005 . ?Z0005 ?r2 ?A1 . ?Z0005 ?r3 ?A2 . }
    } as ?neg)
}
```

A corresponding bind query could be formulated from the metarule as follows:

```
select *{
    {select *   {
        <http://a/honda> ?r0 ?A0 . <http://a/honda> ?r1 ?Z0000 . ?Z0000 ?r2 ?A1 . ?Z0000 ?r3 ?A2 .
        <http://a/ford> ?r0 ?A0 . <http://a/ford> ?r1 ?Z0001 . ?Z0001 ?r2 ?A1 . ?Z0001 ?r3 ?A2 .
        <http://a/renault> ?r0 ?A0 . <http://a/renault> ?r1 ?Z0002 . ?Z0002 ?r2 ?A1 . ?Z0002 ?r3 ?A2 .
    }}
```

```
filter not exists{<http://a/number> ?r0 ?A0 . <http://a/number> ?r1 ?Z0003 . ?Z0003 ?r2 ?A1 . ?Z0003 ?r3 ?A2 . }
filter not exists{<http://a/subway> ?r0 ?A0 . <http://a/subway> ?r1 ?Z0004 . ?Z0004 ?r2 ?A1 . ?Z0004 ?r3 ?A2 . }
filter not exists{<http://a/allegro> ?r0 ?A0 . <http://a/allegro> ?r1 ?Z0005 . ?Z0005 ?r2 ?A1 . ?Z0005 ?r3 ?A2 . }
} limit 5
```

Accordingly, the following relations, temporary variables and constants can be instantiated from the bind query:
r0→http://r/isA,
Z0002→http://a/car,
A2→http://a/railroad,
r1→http://r/isA,
A1→http://a/road,
Z0001→http://a/crossing,
r2→http://r/relatedTo,
r3→http://r/relatedTo,
Z0000→http://a/car,
A0→http://a/company The methods described above may be applied to virtually any kind of database dealing with discrete data (as opposed to continuous data). Although approaches above assume that the relations in the knowledge graph and the training samples have an arity of two, conventional approaches could be used to adapt the methods above so that relations having a different arity may be used. Developing a final metarule and computing a knowledge graph query in separate steps may bring practical benefits to runtime optimization. Developing the test metarule might not be data intensive but may be implemented with a high-level programming language in view of the complexity of the algorithm; developing the test metarule could also be carried out outside a database environment, e.g., in an application that determines the test metarule and uses the test metarule to compute check queries for iteratively querying a graph database.

In contrast, generating a platform-specific query may be data intensive because many queries may be performed as close as possible to the underlying data during query execution it may be desirable to determine a query that contains the lowest number of stored procedures and still returns NOKP, OKP, OKPN.

Metarules may be determined using working memory (RAM); a performance bottleneck may arise when using executing queries derived from the metarules against the database. The performance bottleneck may be mitigated by minimizing the number of queries executed. One way this is achieved is by using NOKP responses to control development of the test metarule and refraining (i.e., via the roll back or switch) from executing queries based on test metarules that cannot lead to an OKPN response.

Figure 2:
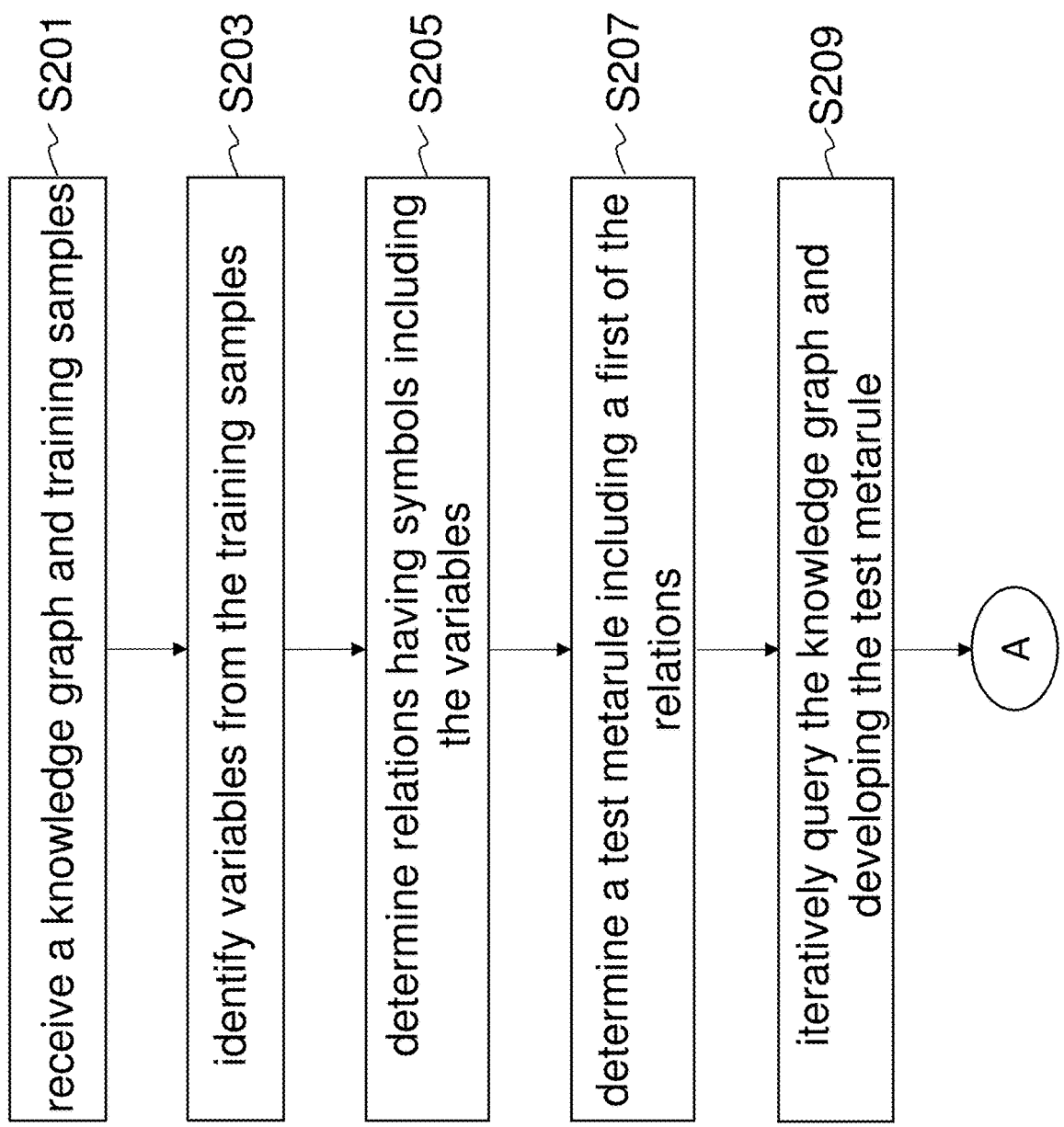
FIG. 2 shows steps of a method according to some embodiments.
Figure 3:
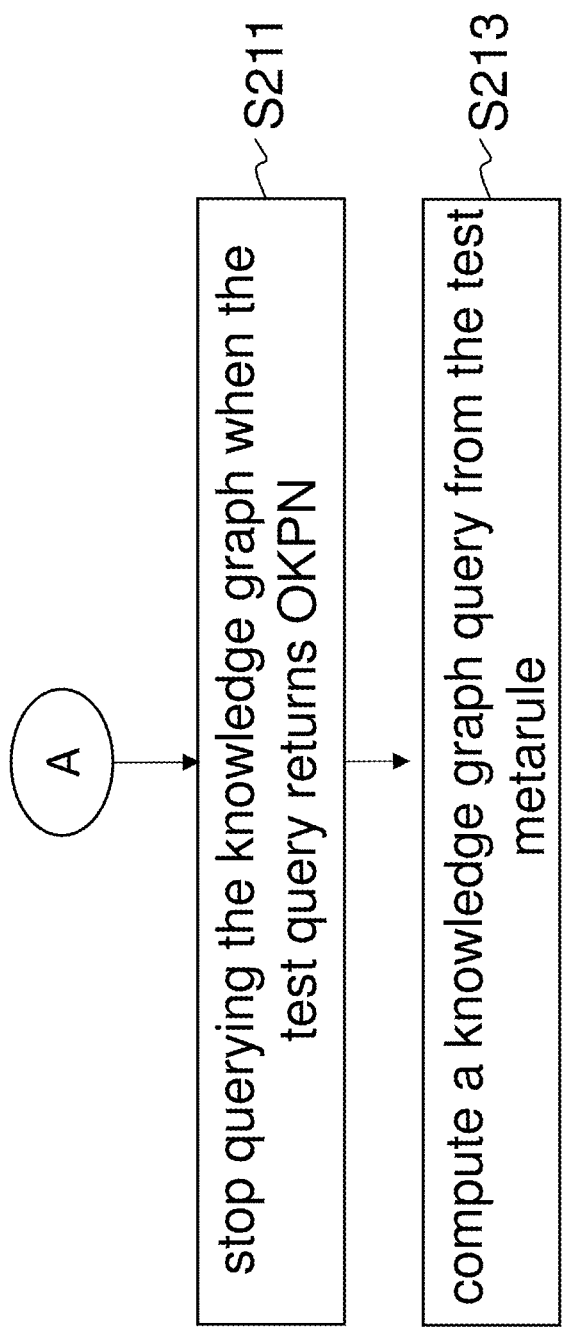
FIG. 3 shows further steps of the method.

FIGS. 2 and 3 shows steps of a computer implemented method for determining a knowledge graph query having a response conforming to a plurality of training samples. The steps may be carried out using techniques described above.

At step S201, a knowledge graph is received. In addition, training samples are received. Each of the training samples is a relation and each value in the training samples corresponds to one of the nodes of the knowledge graph. The training samples include one or more positive training samples and one or more negative training samples.

At step S203, one or more variables are identified from the training samples.

At step S205, a plurality of relations is determined. Each of the relations includes symbols. The symbols include the identified variables. The plurality of relations may be modified during subsequent steps.

At step S207, a test metarule including a first relation from the plurality of relations is determined.

At step S209, iterative querying of the knowledge graph using the test metarule is carried out. Development of the test metarule is controlled according to responses to the queries. Accordingly, no two queries of the knowledge graph may use the same test metarule. Each of the responses to the queries is one of the following:
NOKP, which is returned when the test metarule does not match all of the positive training samples,
OKP, which is returned when the test metarule matches all of the positive training samples but does not exclude all of the negative training samples;
OKPN, which is returned when the test metarule matches all of the positive training samples and excludes all of the negative training samples.

Turning to FIG. 3, querying ends at step S211. In particular, querying ends when the response to one of the queries is OKPN. The test metarule used to obtain the response of OKPN is used as a final metarule.

At step S213, a knowledge graph query is computed from the final metarule (i.e., the last test metarule). The knowledge graph query has a response conforming to the training samples.

Figure 4:
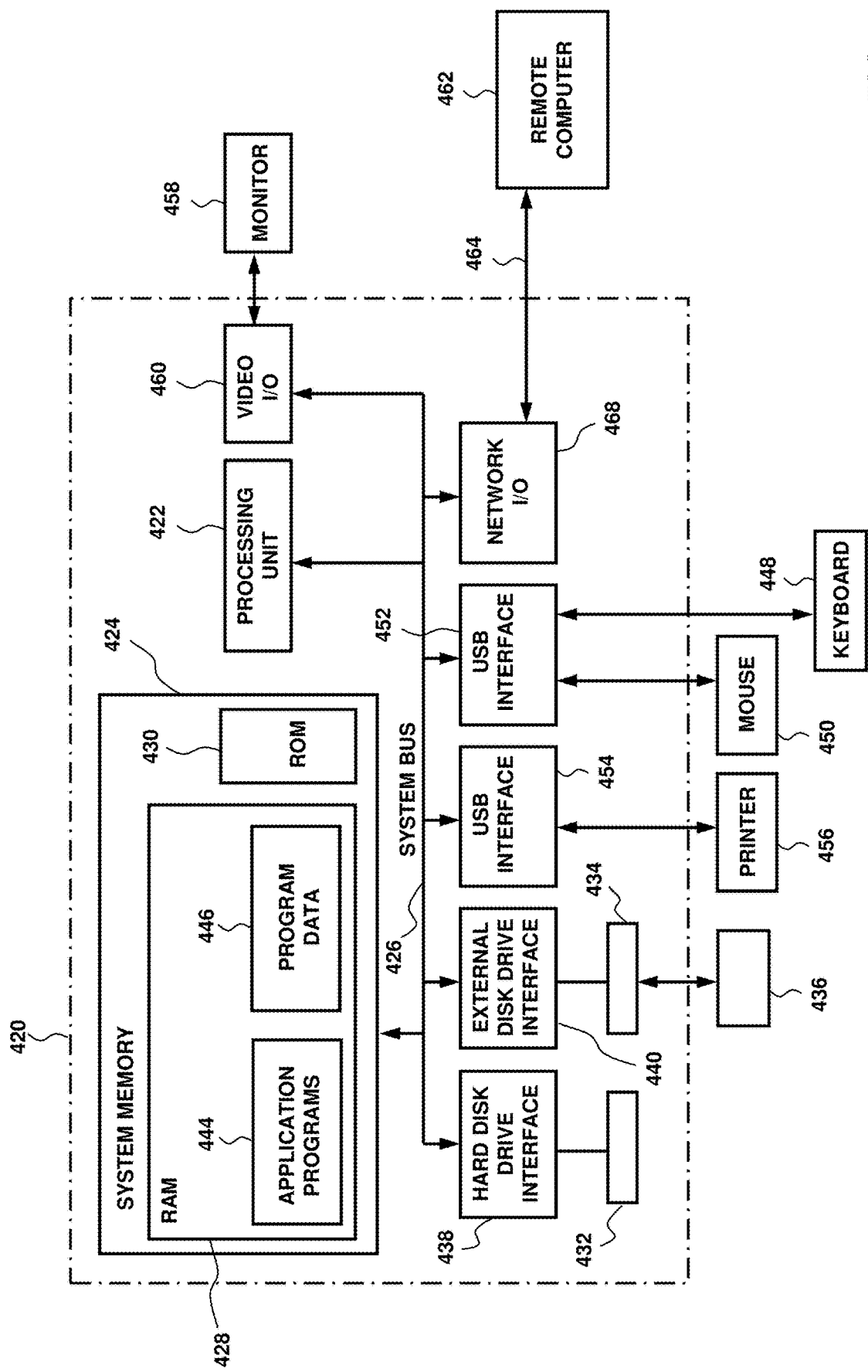
FIG. 4 shows an exemplary system for implementing the claimed subject matter.

FIG. 4 shows an exemplary system for implementing the claimed subject matter including a general purpose computing device in the form of a conventional computing environment 420 (e.g., a personal computer). The conventional computing environment includes a processing unit 422, a system memory 424, and a system bus 426. The system bus couples various system components including the system memory 424 to the processing unit 422. The processing unit 422 may perform arithmetic, logic and/or control operations by accessing the system memory 424. The system memory 424 may store information and/or instructions for use in combination with the processing unit 422. The system memory 424 may include volatile and non-volatile memory, such as a random access memory (RAM) 428 and a read only memory (ROM) 430. A basic input/output system (BIOS) containing the basic routines that helps to transfer information between elements within the personal computer 420, such as during start-up, may be stored in the ROM 430. The system bus 426 may be any of several types of bus structures including a memory bus or memory controller, a peripheral bus, and a local bus using any of a variety of bus architectures.

The personal computer 420 may further include a hard disk drive 432 for reading from and writing to a hard disk (not shown), and an external disk drive 434 for reading from or writing to a removable disk 436. The removable disk may be a magnetic disk for a magnetic disk driver or an optical disk such as a CD-ROM for an optical disk drive. The hard disk drive 432 and the external disk drive 434 are connected to the system bus 426 by a hard disk drive interface 438 and an external disk drive interface 440, respectively. The drives and their associated computer-readable media provide non-volatile storage of computer readable instructions, data structures, program modules and other data for the personal computer 420. The data structures may include relevant data for the implementation of the method for determining a knowledge graph query having a response conforming to a plurality of training samples, as described above.

Although the exemplary environment described herein employs a hard disk (not shown) and an external disk 436, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 436, ROM 430 or RAM 428, including an operating system (not shown), one or more application programs 444, other program modules (not shown), and program data 446. The application programs may include at least a part of the functionality described in connection with FIGS. 1 to 3.

A user may enter commands and information, as discussed below, into the personal computer 420 through input devices such as keyboard 448 and mouse 450. Other input devices (not shown) may include a microphone (or other sensors), joystick, game pad, scanner, or the like. These and other input devices may be connected to the processing unit 422 through a serial port interface 452 that is coupled to the system bus 426, or may be collected by other interfaces, such as a parallel port interface 454, game port or a universal serial bus (USB). Further, information may be printed using printer 456. The printer 456, and other parallel input/output devices may be connected to the processing unit 422 through parallel port interface 454. A monitor 458 or other type of display device is also connected to the system bus 426 via an interface, such as a video input/output 460. In addition to the monitor, computing environment 420 may include other peripheral output devices (not shown), such as speakers or other audible output.

The computing environment 420 may communicate with other electronic devices such as a computer, telephone (wired or wireless), personal digital assistant, television, or the like. To communicate, the computer environment 420 may operate in a networked environment using connections to one or more electronic devices. FIG. 4 depicts the computer environment networked with remote computer 462. The remote computer 462 may be another computing environment such as a server, a router, a network PC, a peer device or other common network node, and may include many or all of the elements described above relative to the computing environment 420. The logical connections depicted in FIG. 4 include a local area network (LAN) 464 and a wide area network (WAN) 466. Such networking environments are commonplace in offices, enterprise-wide computer networks, intranets and the Internet and may particularly be encrypted.

When used in a LAN networking environment, the computing environment 420 may be connected to the LAN 464 through a network I/O 468. In a networked environment, program modules depicted relative to the computing environment 420, or portions thereof, may be stored in a remote memory storage device resident on or accessible to remote computer 462. Furthermore, other data relevant to determining a knowledge graph query having a response conforming to a plurality of training samples (as described above) may be resident on or accessible via the remote computer 462. It will be appreciated that the network connections shown are exemplary and other means of establishing a communications link between the electronic devices may be used.

The above-described computing system is only one example of the type of computing system that may be used to implement the method for determining a knowledge graph query having a response conforming to a plurality of training samples.

What is claimed is:

1. A computer-implemented method for determining a knowledge graph query having a response conforming to a plurality of training samples, the method comprising:
   receiving a knowledge graph;
   receiving the training samples, wherein each of the training samples is a relation, wherein each value in the training samples corresponds to one of the nodes of the knowledge graph, wherein the training samples include one or more positive training samples and one or more negative training samples;
   identifying one or more variables from the training samples;
   determining a plurality of relations, wherein each of the relations includes a plurality of symbols, the symbols including the identified variables;
   determining a test metarule, the test metarule including a first relation from the plurality of relations;
   iteratively querying the knowledge graph using the test metarule and controlling development of the test metarule according to responses to the queries, wherein each of the responses is one of the following:
      NOKP, which is returned when the test metarule does not match all of the positive training samples,
      OKP, which is returned when the test metarule matches all of the positive training samples but does not exclude all of the negative training samples;
      OKPN, which is returned when the test metarule matches all of the positive training samples and excludes all of the negative training samples;
   when the response to the querying is OKPN, ending the querying and using the developed test metarule as a final metarule; and
   computing the knowledge graph query having a response conforming to the training samples from the final metarule.

2. The method of claim 1, wherein the knowledge graph comprises a plurality of nodes,
   wherein a subset of the nodes are connected by edges,
   wherein there is no more than one edge between any two nodes,
   wherein there may be exactly one edge between every two nodes such that each relation in the knowledge graph has an arity of two.

3. The method of claim 2, wherein the number of identified variables corresponds to the arity of the training samples.

4. The method of claim 2, wherein
   if the arity of the training samples is one or two, then the number of identified variables corresponds to the arity of the training samples,
   if the arity of the training samples is greater than two, identifying the one or more variables comprises:
   obtaining binary relations from the training samples via reification,
   identifying two variables from the binary relations.

5. The method of claim 1, further comprising defining one or more limits for variables, wherein the limits include one or more of the following:
   a maximum number of intermediate variables and/or a maximum number of intermediate variables per identified variable;

a maximum number of restrictions per variable;

a maximum number of restrictions, wherein each restriction comprises a relation including a variable and a constant.

6. The method of claim 5, wherein the symbols further include the maximum number of intermediate variables and one or more constants, wherein the intermediate variables can be used to join one of the identified variables to another one of the identified variables and/or to join one of the identified variables to one of the constants, wherein the constants are determined from the knowledge graph.

7. The method of claim 6, wherein controlling the development of the test metarule comprises:

when OKP is returned as a response and none of the limits for variables has been reached, restricting one of the variables in the test metarule, comprising:

combining the further variable with a restriction in a new relation, and adding the new relation to the test metarule, wherein the restriction includes one of the constants.

8. The method of claim 1, wherein controlling the development of the test metarule comprises adding one or more relations from the plurality of relations to the test metarule, wherein, when NOKP is returned as a response, controlling the development of the test metarule further comprises rolling back addition of at least one relation from the test metarule before adding the one or more relations to the test metarule.

9. The method of claim 7, wherein controlling the development of the test metarule comprises, when NOKP is returned as a response or one of the limits for variables has been reached, switching at least one of the relations of the test metarule with corresponding relations from the plurality of relations.

10. The method of claim 9, wherein the switching comprises, when a next test relation from the plurality of relations includes a permutation of one of the relations in the test metarule that has not yet been tried, switching the one of the relations with the next test relation;

when there is no next test relation in the plurality of relations, ending the querying without finding a final metarule.

11. The method of claim 10, further comprising adding at least one join to the test metarule, the join including one of the intermediate variables;

wherein the join may include one of the following:

one relation having one of the intermediate variables in the test metarule and one of the constants that is not in the test metarule;

a first relation having one of the identified variables in the test metarule and one of the intermediate variables not in the test metarule and a second relation having the one of the intermediate variables not in the test metarule and one of the constants, or a first relation having one of the identified variables and one of the intermediate variables and a second relation having one of the intermediate variables and one of the constants, or a first relation having one of the intermediate variables in the test metarule and another one of the intermediate variables in the test metarule and a second relation having the other one of the intermediate variables in the test metarule and one of the constants not in the test metarule.

12. The method of claim 1, wherein identifying one or more variables from the training samples comprises identifying at least two variables from the training samples.

13. The method of claim 1, wherein the knowledge graph is a NoSQL database and/or a graph database, wherein the knowledge graph has no predefined schema.

14. A computer system for determining a knowledge graph query having a response conforming to a plurality of training samples, the system comprising:

one or more processors configured to:

receive a knowledge graph;

receive the training samples, wherein each of the training samples is a relation, wherein each value in the training samples corresponds to one of the nodes of the knowledge graph, wherein the training samples include one or more positive training samples and one or more negative training samples;

identify one or more variables from the training samples, wherein the number of identified variables corresponds to [or is equal to] the arity of the training samples;

determine a plurality of relations, wherein each of the relations includes a plurality of symbols, the symbols including the identified variables;

determine a test metarule, the test metarule including a first relation from the list of relations;

iteratively query the knowledge graph with the test metarule and control development of the test metarule according to responses to the queries, wherein each of the responses is one of the following:

NOKP, which is returned when the test metarule does not match all of the positive training samples;

OKP, which is returned when the test metarule matches all of the positive training samples but does not exclude all of the negative training samples;

OKPN, which is returned when the test metarule matches all of the positive training samples and excludes all of the negative training samples;

when the response to the query is OKPN, end the iterative querying and use the developed test metarule as a final metarule; and compute the knowledge graph query having a response conforming to the training samples from the final metarule.

15. The system of claim 14, wherein the knowledge graph comprises a plurality of nodes, wherein a subset of the nodes are connected by edges, wherein there is no more than one edge between any two nodes, wherein there may be exactly one edge between every two nodes such that each relation in the knowledge graph has an arity of two.

16. The system of claim 15, wherein if the arity of the training samples is one or two, then the number of identified variables corresponds to the arity of the training samples, if the arity of the training samples is greater than two, identifying the one or more variables comprises:

obtaining binary relations from the training samples via reification, identifying two variables from the binary relations.

17. The system of claim 14, the one or more processors configured to define one or more limits for variables, wherein the limits include one or more of the following:

a maximum number of intermediate variables and/or a maximum number of intermediate variables per identified variable;

a maximum number of restrictions per variable;

a maximum number of restrictions, wherein each restriction comprises a relation including a variable and a constant.

18. A computer program product comprising instructions that, when executed by a computer, cause the computer to:

receive a knowledge graph;

receive the training samples, wherein each of the training samples is a relation, wherein each value in the training samples corresponds to one of the nodes of the knowledge graph, wherein the training samples include one or more positive training samples and one or more negative training samples;

identify one or more variables from the training samples, wherein the number of identified variables corresponds to [or is equal to] the arity of the training samples;

determine a plurality of relations, wherein each of the relations includes a plurality of symbols, the symbols including the identified variables;

determine a test metarule, the test metarule including a first relation from the list of relations;

iteratively query the knowledge graph with the test metarule and control development of the test metarule according to responses to the queries, wherein each of the responses is one of the following:

NOKP, which is returned when the test metarule does not match all of the positive training samples;

OKP, which is returned when the test metarule matches all of the positive training samples but does not exclude all of the negative training samples;

OKPN, which is returned when the test metarule matches all of the positive training samples and excludes all of the negative training samples;

when the response to the query is OKPN, end the iterative querying and use the developed test metarule as a final metarule; and compute the knowledge graph query having a response conforming to the training samples from the final metarule.

19. The computer program product of claim 18, wherein the knowledge graph comprises a plurality of nodes, wherein a subset of the nodes are connected by edges, wherein there is no more than one edge between any two nodes, wherein there may be exactly one edge between every two nodes such that each relation in the knowledge graph has an arity of two.

20. The computer program product of claim 19, wherein if the arity of the training samples is one or two, then the number of identified variables corresponds to the arity of the training samples, if the arity of the training samples is greater than two, identifying the one or more variables comprises:

obtaining binary relations from the training samples via reification, identifying two variables from the binary relations.

* * * * *